Figure 4:
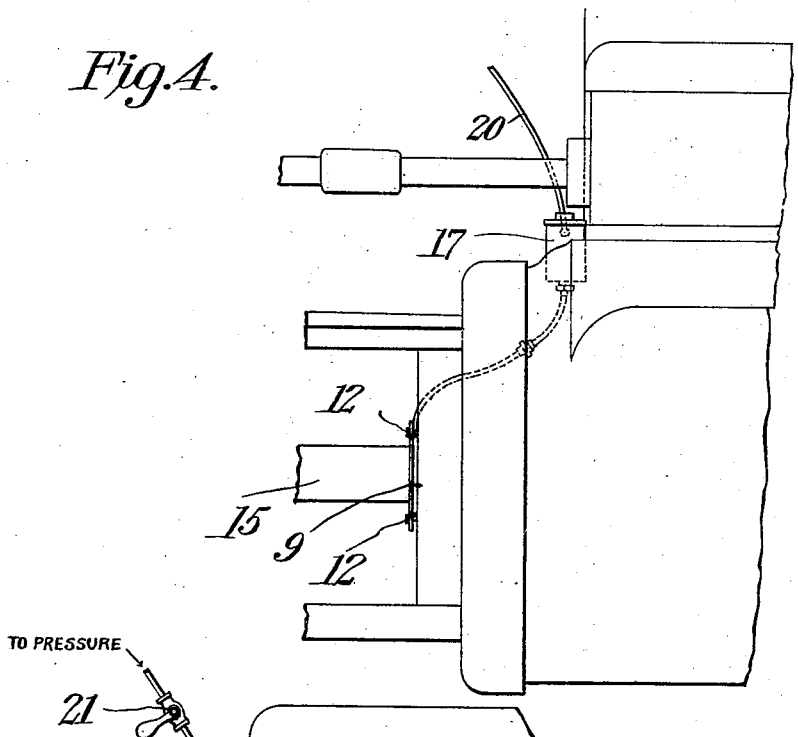

No. 880,680. PATENTED MAR. 3, 1908.
C. J. MATTHEWS.
LUBRICATOR.
APPLICATION FILED JUNE 15, 1907.
2 SHEETS—SHEET 1.
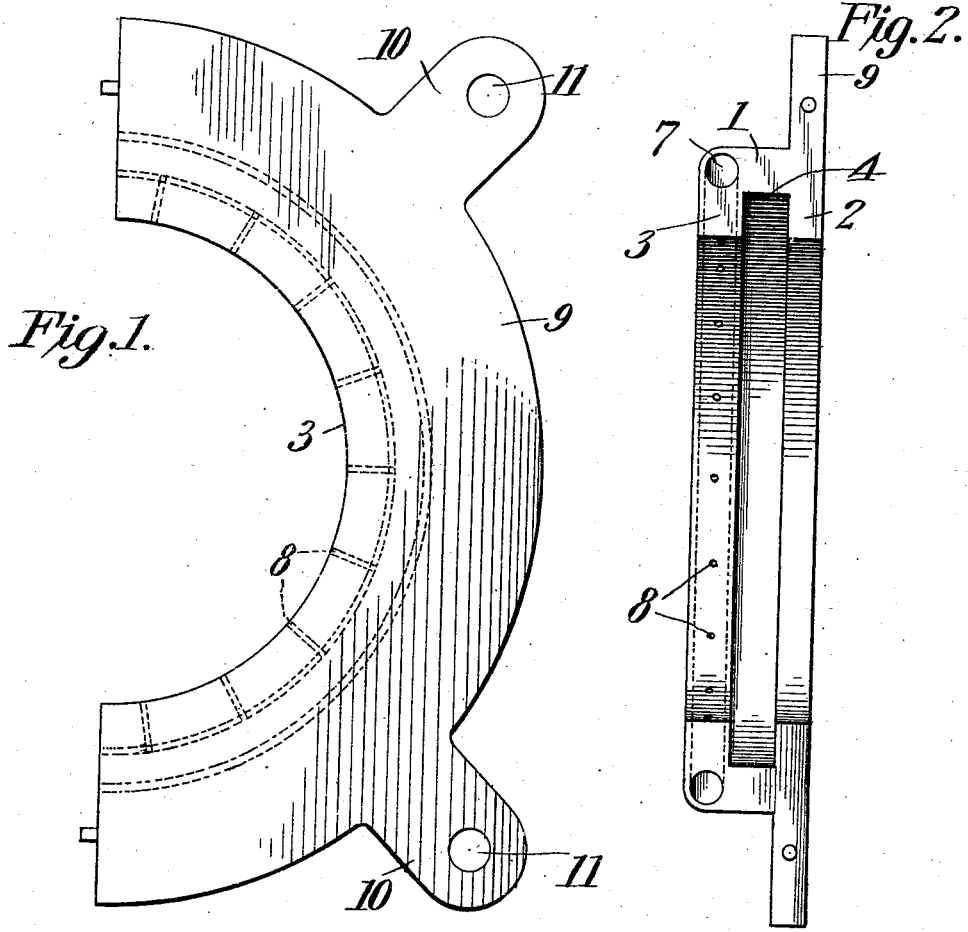
WITNESSES:
Christopher J. Matthews.
INVENTOR
By C.A.Snow & Co.
ATTORNEYS No. 880,680. PATENTED MAR. 3, 1908.
C. J. MATTHEWS.
LUBRICATOR.
APPLICATION FILED JUNE 15, 1907.

2 SHEETS—SHEET 2.

WITNESSES:

Christopher J. Matthews
INVENTOR

By

ATTORNEYS

UNITED STATES PATENT OFFICE.

CHRISTOPHER J. MATTHEWS, OF GRAND RAPIDS, MICHIGAN.

LUBRICATOR.

No. 880,680.  Specification of Letters Patent.  Patented March 3, 1908.

Application filed June 15, 1907. Serial No. 379,245.

*To all whom it may concern:*

Be it known that I, CHRISTOPHER J. MATTHEWS, a citizen of the United States, residing at Grand Rapids, in the county of Kent and State of Michigan, have invented a new and useful Lubricator, of which the following is a specification.

This invention has reference to improvements in lubricators and is designed to provide a means whereby grease may be applied to a piston or valve rod exterior to the steam packing and still be confined to the rod so as to thoroughly lubricate the same on its passage through the packing gland at the end of the cylinder or valve box.

The present invention is in the nature of an attachment and includes a means whereby the grease for lubrication may be fed to the piston or valve rod at any time desired and so long as desired, and the entire device is adaptable to engines already installed, requiring no change whatever in such engines, and at the same time providing them with forced feed lubricators.

By the present invention the piston rod is surrounded by a suitable swab fast in a holder and the grease is forced into contact with the rod between such swab and the steam packing, the structure being such that the grease will not escape beyond the swab when the rod is forced outwardly but will be carried to the packing gland and there thoroughly lubricate the rod on its passage through the packing.

On locomotives or other steam engines, which, because of the conditions under which they operate, are usually only lubricated when standing still, the present invention provides a means whereby the locomotive engineman may apply the heavy greases which are best adapted to lubricating such machinery, while the engine is at full speed, if he so desires. For this purpose there is provided a grease cup upon a convenient portion of the engine, near each point to be greased, and means are also provided whereby air or steam pressure may be caused to act upon the grease cup to force the grease out from the same to the lubricator. By this means the application of the grease to the moving parts is directly under the control of the engineman and grease need not be constantly applied, as would be the case were a constant-pressure grease cup used. When it is desirable to apply the lubricant, the engineman has but to turn on the air or steam pressure and the grease is forced from the grease cup to the lubricator and from thence directly against the piston or valve rod and is conveyed by the latter to the bearing surface to be lubricated.

The invention will be best understood by reference to the following detailed description, taken in connection with the accompanying drawings, in which,—

Figure 5:
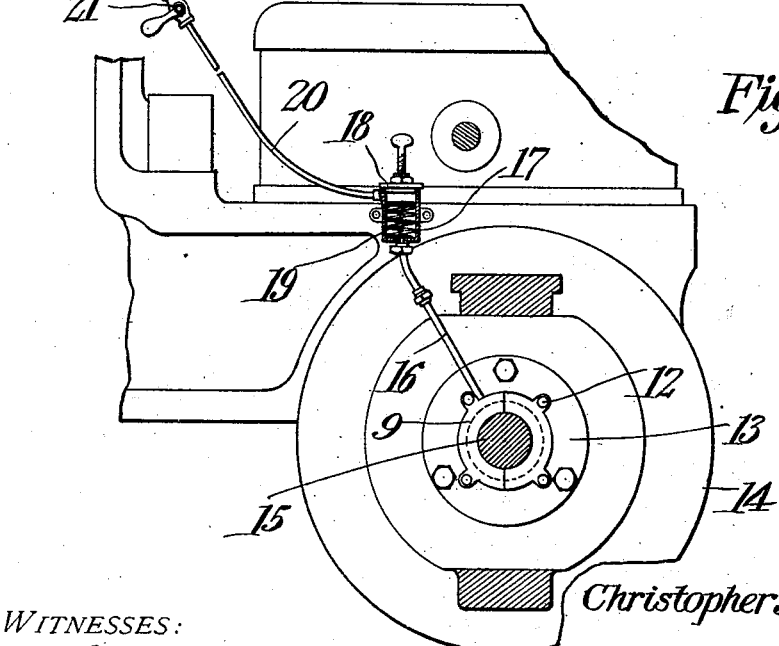

Figure 1 is a face view of one half of the improved lubricator; Fig. 2 is a side elevation of the same; Fig. 3 is a cross section through the lubricator; Fig. 4 is a side elevation of one end of an engine cylinder, showing the application of the improved lubricating means thereto; and Fig. 5 is an end elevation, with parts in section, of the cylinder and the lubricating means.

Since the lubricator is designed to be applied to installed structures without disturbing such structures and without requiring that said structures be dismantled, the lubricator is made in two parts so as to be readily applied to a piston or valve rod. In Figs. 1 and 2 one of the halves of the lubricator is shown. This structure is composed of a half-ring 1 having a radially inwardly projecting flange 2 at one side and another similar flange 3 at the other side, the two flanges being spaced apart and provided with a groove 4 designed to receive its portion of a ring 6 of suitable material such as felt or some other substance that will operate as a swab or wiper to prevent a piston or valve rod with which it is in contact from carrying the lubricant past it. Coincident with the flange 3, the half-ring 1 is provided with a duct or passage 7 from which lead a number of other passages 8 opening on the inner face of the flange 3. When two half-rings 1 are placed with their ends in conjunction the passages 7 constitute a single annular duct. Projecting radially outward from the ring 1 opposite to the flange 2 is another flange 9 upon which are formed ears 10 suitably perforated, as shown at 11, for the passage of screws or bolts 12 (see Figs. 4 and 5) by which the device is fastened to the packing gland 13 of a piston 14 and is made to embrace the piston-rod 15. What may hereinafter be stated with reference to the piston-rod is to be understood as applying with equal force to a valve-rod or any other similar part of a machine requiring lubrication in the manner for which the present structure is devised.

When the lubricating device is applied to the packing gland 13 the flanges 2 and 9 are outermost, while the flange 3 is nearer to the packing surrounding the piston within the packing gland. Exterior to the flange 3 is the swab ring 6.

Communicating with the duct 7 at some convenient point is a pipe 16 leading to and communicating with the bottom of a grease cup 17. This grease cup is shown as having an interior plunger 18 between which and the bottom of the cup is inserted a helical spring 19. Communicating with the upper portion of the grease cup above the plunger 18 is a pipe 20 leading to the air system of the train, when the device is located on a train, or to a source of steam supply, as the case may be. The application of pressure through the pipe 20 is entirely under the control of the engineman at a point distant from the grease cup 17. In the drawing, Fig. 5, the pipe 20 is shown provided with a valve 21 which may be taken simply as indicative of any suitable means for admitting pressure to the pipe 20 or for releasing such pressure therefrom, and this valve is assumed to be located within easy reach of the engineman, while the pipe 20 is assumed to be connected with either the air system of the train or with the steam supply from the boiler. Now, let it be supposed that the interior of the grease cup below the plunger 18 is filled with heavy lubricating grease and that it is desirable to cause this grease to be deposited upon the piston-rod, but that it is not desirable that the application of grease should be constant. The engineman can apply air or steam pressure through the pipe 20 to the top of the plunger 18 and cause the latter to descend against the action of the spring 19 and the resistance of the grease, so that such grease is caused to flow through the pipe 16 and into the duct 7, from whence the pressure impelling the grease will cause the latter to find its way through the passages 8 and on to the piston-rod which, in practice, is in close relation to the inner edge or face of the flange 3. The openings 8 are purposely made small and the diameter of the duct 7 is comparatively large. By this means the grease is evenly distributed around the piston-rod and quickly finds its way to the bearing surfaces at the steam packing, while it is prevented from passing beyond the lubricator by the swab ring or wiper 6.

When the engineman considers that a sufficient amount of grease has been applied to the piston-rod, he exhausts the pipe 20 and the reaction of the spring 19 returns the plunger 18 to its normal position. The pressure on the grease being removed, said grease is no longer fed to the piston-rod and thus there is no waste of grease, and neither is there a superabundance. The engineman can apply the grease at as frequent intervals as is thought desirable, and this without the necessity of stopping the engine to reach the parts which are inaccessible when the engine is in motion.

From the foregoing description it will be seen that this lubricator may be easily applied to or removed from the piston or valve rods and that the application of the lubricator requires no dismantling of the engine but only the boring and tapping of screw holes in the gland flange for the fastening thereto of the lubricator.

I claim:—

1. A lubricator for distributing grease on piston or valve rods, comprising a removable annular structure surrounding the rod exterior to the packing gland for said rod, said structure being provided with an annular seat for a swab or wiper, an annular duct for receiving grease, and an annular series of free radial passages from said duct to points adjacent to the rod.

2. A lubricator for distributing grease on piston or valve rods, comprising a removable annular structure surrounding the rod exterior to the packing gland for said rod, said structure being provided with an annular seat for a swab or wiper, an annular duct for receiving grease, and an annular series of free radial passages from said duct to points adjacent to the rod, the cross sectional area of the duct being greater than that of the passages leading therefrom.

In testimony that I claim the foregoing as my own, I have hereto affixed my signature in the presence of two witnesses.

CHRISTOPHER J. MATTHEWS.

Witnesses:
   J. F. LINDLEY,
   A. M. CEITS.